United States Patent [19]

Bott et al.

[11] Patent Number: 5,198,501

[45] Date of Patent: Mar. 30, 1993

[54] IN-SITU POLYMERIZED BLENDS OF VINYL ACETATE/ETHYLENE COPOLYMAR AND POLY(VINYL CHLORIDE)

[75] Inventors: Richard H. Bott; Lloyd M. Robeson, both of Macungie; Hsueh-Chi Lee, Allentown; Cajetan F. Cordeiro, Kutztown, all of Pa.

[73] Assignee: Air Products and Chemicals, Inc., Allentown, Pa.

[21] Appl. No.: 570,071

[22] Filed: Aug. 20, 1990

[51] Int. Cl.$^5$ .................. C08L 27/06; C08F 2/18; C08F 114/06; C08F 118/08

[52] U.S. Cl. .................. 525/266; 525/239; 525/244; 525/302

[58] Field of Search ............... 525/266, 302, 239, 244

[56] References Cited

U.S. PATENT DOCUMENTS

| | | | |
|---|---|---|---|
| 2,297,194 | 9/1942 | Badum | 260/42 |
| 3,562,354 | 2/1971 | Golstein | 260/836 |
| 3,764,638 | 10/1973 | Hwa et al. | 260/876 R |
| 3,780,140 | 12/1973 | Hammer | 260/884 |
| 4,115,479 | 9/1978 | Daidone | 260/884 |
| 4,155,954 | 5/1979 | Buning et al. | 260/878 R |
| 4,180,447 | 12/1979 | Sencar | 204/159.17 |
| 4,323,661 | 4/1982 | Kraus et al. | 525/259 |
| 4,794,142 | 12/1988 | Alberts et al. | 525/221 |

OTHER PUBLICATIONS

R. A. Emmett, "Acrylonitrile-Butadiene Copolymers-Mixtures With Plasticized Polyvinyl Chloride", Industrial Engineering Chemistry, vol. 36, pp. 730-734, (1944).
C. F. Hammer, "Cooperative Molecular Motion in Blends of Poly(vinylchloride) with Ethylene-Vinyl Acetate Copolymers", Macromolecules, vol. 4, pp. 69-71, (1971).
Hickman and Ikeda, "Studies of Polymer Blends. I. Compatibility of Poly(vinyl chloride) and Poly(ethylene-co-vinyl acetate-co-sulfur dioxide)", Journal of Polymer Science, Polymer Physics Edition, vol. 11, pp. 1713-1721 (1973).
L. M. Robeson et al., "Miscibility of Poly(Vinyl Chloride) with Ethylene-Ethyl Acrylate-Carbon Monoxide Terpolymers", Polymer Engineering and Science, vol. 17, pp. 300-304, (1977).
L. M. Robeson, "Crystallization Kinetics of Poly-$\epsilon$-caprolactone from Poly-$\epsilon$-caprolactone/Poly(vinyl chloride) Solutions", Journal of Applied Polymer Science, vol. 17, pp. 3607-3617, (1973).
Walsh and McKeown, "Compatibility of polyarylates and polymethacrylates with poly(vinyl chloride): 2. Measurement of interaction parameters", Polymer, vol. 21, pp. 1335-1340 (1980).
M. Matzner et al., "Miscibility of Poly(vinyl chloride) with Ethylene/N,N-Dimethylacrylamide Copolymers", Makromol. Chem., 183, pp. 2871-2879 (1982).
D. F. Walsh et al., "In Situ polymerization of n-butyl acrylate in poly(vinyl chloride)", Polymer, vol. 25, pp. 1023-1027 (1984).
L. M. Robeson, "Miscible Polymer Blends Containing Poly(vinyl chloride)", Journal of Vinyl Technology, Jun. 1990, vol. 12, No. 2, pp. 89-94.

*Primary Examiner*—James J. Seidleck
*Assistant Examiner*—W. R. H. Clark
*Attorney, Agent, or Firm*—Mark L. Rodgers; William F. Marsh; James C. Simmons

[57] ABSTRACT

A poly(vinyl chloride) product is provided containing as a permanent plasticizer, a copolymer of vinyl acetate and ethylene which is copolymerized in the presence of porous particles of the PVC. The copolymerization is carried out in either suspension or emulsion and under conditions which provide a copolymer containing 60 to 85 wt % vinyl acetate in amounts from about 20 to 60 wt % of the vinyl acetate/ethylene copolymer in the final composition. A free flowing powder is formed which can be used for PVC compounding operations. If over 60 up to 80 wt % of the composition contains the copolymer, the product is a reinforced VAE dispersion.

10 Claims, No Drawings

IN-SITU POLYMERIZED BLENDS OF VINYL ACETATE/ETHYLENE COPOLYMAR AND POLY(VINYL CHLORIDE)

FIELD OF THE INVENTION

This invention relates to a method of making miscible blends of poly(vinyl chloride), (PVC), and a copolymer of vinyl acetate and ethylene (VAE). In another aspect of the invention relates to a flowable powder of polymer particles which are a compatible blend of PVC and VAE. In still another aspect, the invention relates to a modified VAE dispersion containing PVC.

BACKGROUND OF THE INVENTION

PVC is a commodity plastic which is widely used because of its excellent resistance to oxidative attack and other chemical reactions. The plastic is very weather resistant and has found extensive use as metal coatings, cable insulation, pipe, gaskets, vessel liners, and the like. The natural polymer, however, is fairly rigid and brittle and must be plasticized to make it useful commercially for these applications. This can be readily accomplished, but it is difficult to prevent loss of the plasticizer by volatization or by migration within the plastic itself, thereby changing the properties of the PVC. There has been extensive work, consequently, to develop so called permanent plasticizers which are compatible with PVC, which then retains its valuable mechanical properties over extended periods of time.

U.S. Pat. No. 2,297,194, Badum (1942) describes one of the earliest successful attempts to plasticize PVC so that it could be used as a cable insulation. In this case the plasticizer was a copolymer of butadiene and acrylonitrile. This was also reported by Emmett, *Industrial Engineering Chemistry*, 36, pages 730-4 (1944), who describes PVC plasticized with butadiene/acrylonitrile rubber. The blends were made by milling masterbatches of the polymers.

As early as 1971, Hammer in *Macromolecules*, 4, pages 69-71, reported that compatible blends of PVC and VAE copolymers can be prepared, provided the copolymer contains 60 to 75 wt. % of vinyl acetate. Hammer was reporting the discovery of a co-worker, but he himself had worked with containing 65 to 70 wt. % vinyl acetate. He stated that the blending can be carried out on a 2-roll mill or by solution blending. In actual practice, however, processing PVC with VAE copolymers containing such high amounts of vinyl acetate is quite difficult, because of the "gum stock" character of the VAE which is amorphous and has a low Tg. Commonly used PVC processing equipment will accept solids either in particulate or powder form or liquids, but cannot deal with viscous materials having low Tg. Consequently, the commercial utility of these particular VAE copolymers as plasticizers for PVC has not developed further.

Others have attempted to overcome this problem by modifying the VAE copolymer, so that it contains a higher proportion of ethylene without destroying the compatability of the polymer with the PVC. This has been done by preparing a terpolymer which incorporates into the VAE either sulfur dioxide or carbon monoxide. Hickman and Ikeda, *J. Polym. Sci., Polym. Phys. Ed.*, 11, pages 1713-21 (1973) described studies of blends of PVC and terpolymers of ethylene, sulfur dioxide and vinyl acetate, for example, 72.7 mole % ethylene, 18.5 mole % vinyl acetate and 8.8 mole % sulfur dioxide. Compatible blends containing up to 40% of the terpolymer were found and the blends were made on a rubber mill. On the other hand, terpolymers containing only 3.2% sulfur dioxide evidenced incompatibility.

U.S. Pat. No. 3,780,140, Hammer (1973) discloses making a plasticizer for PVC by polymerizing ethylene (40-80%), carbon monoxide (3-30%) and a termonomer (5-60%) which preferably is vinyl acetate. Product blends are said to contain 5 to 95 wt. % of the terpolymer and 5 to 95 wt % of the PVC. Films and rigid or semi-rigid articles are said to be formable by varying the proportions of these polymers. The blends are formed by solution blending the polymers or blending on a roll mill, in an extruder or in a Banbury mixer.

This work was extended by Robeson and McGrath, *Polym. Eng. Sci.*, 17, pages 300-4 (1977) who describe miscible blends of PVC and terpolymers of ethylene, ethyl acrylate and carbon monoxide. These terpolymers are said to contrast with the ethylene/ethyl acrylate copolymers which are not miscible with PVC. Similar results were reported for ethylene/vinyl acetate/carbon monoxide terpolymers and blends were made from solutions in tetrahydrofuran followed by milling to improve homogenity.

Attention has also directed to the development of other permanent plasticizers for PVC. Robeson, *J. Appl. Polym. Sci.*, 17, pages 3607-17 (1973) describes blends of PVC and poly-e-caprolactone (PCL) that result in a true solution. It is reported, however, that the PCL can slowly crystallize out of the solution leading to a loss in flexibility for the blend. The original blends were made from solutions in tetrahydrofuran containing the polymers followed by fluxing on a roll mill.

Walsh and McCowen, *Polymer*, 21, pages 1335-40 (1980) describe measuring the compatibility of polyacrylates and polymethacrylates with PVC by studying the interaction of these polymers with solvents. Matzner, Wise, Robeson and McGrath, *Makromol. Chem.*, 183, pages 2871-9 (1982) disclose miscible polymer blends of PVC and copolymers of ethylene with N,N-dimethylacrylamide, and other compatible polymer combinations. The blending techniques involved solution blending followed by fluxing on a 2-roll mill.

Polymerization of one polymer in the presence of the other has been reported for a number of combinations in efforts to permanently plasticize PVC. Over two decades ago, Golstein, U.S. Pat. No. 3,562,354 (1971) disclosed copolymerizing vinyl acetate and either glycidyl acrylate or methyacrylate in the presence of porous grains of PVC. The porous PVC grains could be made in aqueous suspension with a dispersing agent which increases the PVC porosity. This porosity is measured by the ability of the PVC to absorb plasticizer and it is said that the PVC should absorb at least 15 and preferably at least 25 grams of plasticizer per 100 grams of the PVC. The amounts of copolymer added were 0.1 to 7 wt. % glycidyl acrylate and 0.1 to 15% vinyl acetate. The composition was said to be useful for metal coatings either by fluid bed or electrostatic processes.

U.S. Pat. No. 3,764,638 Hwa et al., (1973) discloses polymerizing an acrylic monomer, for example, methylmethacrylate, in the presence of a PVC emulsion so that the acrylic polymer is formed in or on the preformed PVC particles. The product obtained can be added to other PVC as a processing aid. The acrylic polymer can comprise 10 to 50 wt % of the product and the balance is PVC.

U.S. Pat. No. 4,115,479 Daidone (1978) describes making casting resins containing 20 to 65% vinyl resin by polymerizing a monomer such as methylmethacrylate in the presence of a vinyl resin, such as PVC, of two particle sizes, one resin 10.2 to 5 microns and the other 15 to 150 microns.

U.S. Pat. No. 4,180,447 Sencar (1979) describes making PVC foams from PVC plus a monomeric softener which is later polymerized with ionizing radiation. From 10 to 50 wt %, based on the PVC, of the monomers can be used. Examples include methylmethacrylate, but there is no suggestion to use either vinyl acetate or ethylene.

Walsh and Sham, *Polymer*, 25, pages 1023-27 (1984) disclose polymerizing n-butylacrylate in the presence of suspended PVC beads in water. These authors state that the PVC has been found to be miscible with a wide range of polymers containing electron donor groups, such as esters, and further that the polymer blends can be reswollen and additional n-butylacrylate polymerized to produce homogenous blends containing more than 10% n-butylacrylate. These systems, however, are not thermodynamically stable at concentrations where plasticization can be achieved. Even if miscible blends are capable of being prepared from solution, irreversible phase separation occurs once the samples are heated to 140° to 150° C. and, therefore, are not practical for melt processable, permanently plasticized PVC systems.

Others have approached polymerization blending from a different direction. U.S. Pat. No. 4,155,954, Buning et al., (1979) discloses grafting vinyl chloride onto powdered ethylene-vinyl acetate copolymer in a gel phase polymerization. The product can be used to improve impact strength of the PVC. The VAE copolymers contain 0.5 to 15 wt % vinyl acetate and 85 to 99.5 wt % ethylene and about 5 to 70 wt % of the product is grafted vinyl chloride.

U.S. Pat. No. 4,323,661, Kraus et al., (1982) discloses making sinterable molding compositions by graft copolymerization of 85 to 99.5 wt % vinyl chloride in the presence of VAE copolymer, so that the graft copolymer contains 0.09 to 10.5 wt % polymerized ethylene and 0.09 to 10.5 wt % polymerized vinyl acetate. The molding composition also contains free sulfonic acid and a wetting agent. The composition has particular utility in forming battery separation plates. The vinyl chloride is polymerized in suspension in an aqueous phase containing a VAE copolymer of 30 to 70% ethylene and 70 to 30% vinyl acetate and having a molecular weight of 5,000 to 200,000.

In spite of several decades of development, problems remain in methods of incorporating into PVC a VAE copolymer which has a composition making it compatible with the PVC and, therefore, can qualify as a permanent plasticizer. VAE copolymers of this type having a high vinyl acetate content are basically adhesive-type compositions and find utility in such applications. According to Hwa et al., in the '638 patent, the polymerization of an acrylic monomer in the presence of PVC occurs so that the polymer is formed in or on the preformed PVC particles. If the vinyl acetate-ethylene copolymers formed outside the PVC (for example as separate particles) free flowing particles could not result because, when the system is coagulated for recovery, the VAE particles would act as an adhesive between the PVC particles, thus yielding a blocked system without free flowing characteristics. Even if the VAE polymerized within the PVC particles and also on the particles resulting in a coating of VAE, a coagulated product would be formed which would severely block. Another potential problem is apparent in the distribution of the vinyl acetate and ethylene during the copolymerization, since vinyl acetate has a much higher solubility in PVC than ethylene. This property could yield a polymerization of a vinyl acetate rich polymer in the PVC phase and an ethylene rich polymer in the pores of the PVC. Such a compositional split would yield a microheterogeneous system based on polymers which are actually outside the composition which is miscible with PVC.

The prior references which suggest the polymerization of vinyl chloride onto ethylene-vinyl acetate copolymers to yield graft copolymers, do not provide an acceptable answer to the problem. While graft copolymers may be desired for ethylene-vinyl acetate copolymers at higher ethylene concentrations than are permissible for the PVC miscibility, grafting is not desired for the formation of a permanent plasticizer, because excessive grafting would cause major processing problems and would yield a product which resembled a material full of gels or would appear to be lightly cross-linked. Additionally, the phase separated product would not yield properties required for a single phase permanently plasticized composition. This requirement is discussed in a recent article by L. M. Robeson, *J. Vinyl Technology* 12(2), 89 (1990).

BRIEF DESCRIPTION OF THE INVENTION

It has now been found that copolymerization of vinyl acetate and ethylene in proportions which provide a copolymer containing 60 to 85 wt % vinyl acetate in a suspension of porous PVC particles, yields a free flowing powder which is a permanently plasticized PVC and can be readily melt compounded. The rheological characteristics indicate that grafting is minimal. This procedure solves the basic compounding problem which is involved with melt mixing the two polymers prepared and recovered separately, namely, the "gum stock" characteristics of the VAE copolymers which contain the high proportion of vinyl acetate as indicated. Accordingly, a method is provided for making a blend of poly(vinyl chloride) and vinyl acetate/ethylene copolymer, which comprises copolymerizing vinyl acetate and ethylene in a suspension or emulsion system in the presence of porous particles of poly(vinyl chloride) under conditions and with monomer proportions that form a vinyl acetate/ethylene copolymer containing 60 to 85 wt % vinyl acetate. The final composition typically contains from about 20 to 80 wt % of the vinyl acetate/ethylene copolymer. If the copolymer concentration is from about 60 to 80 wt %, the product is a reinforced VAE dispersion.

DETAILED DESCRIPTION OF THE INVENTION

This invention involves the polymerization of VAE copolymers in a suspension or emulsion of prepolymerized porous PVC particles. Such PVC is commercially available. By this term "PVC", it is intended to include all those products which are essentially homopolymers of vinyl chloride, but are also frequently modified by small amounts of other monomers, for example 1% ethylene in the polymerization mixture. Alternatively, the vinyl chloride can be polymerized to form the porous particles and the suspension transferred directly to a pressure vessel which is suitable for copolymerization of vinyl acetate and ethylene. Methods of polymerizing vinyl chloride to form PVC by either the suspension or emulsion procedures are well documented in the art.

The most common process for producing PVC is by suspension polymerization. Liquid vinyl chloride spheres are dispersed in water using protective colloids, such as poly(vinyl alcohol). Upon addition of an appropriate oil-soluble initiator and with agitation, the polymerization occurs yielding particles of dimensions ranging between 50 to 200 microns. A typical suspension process uses similar amounts of water and vinyl chloride monomer by weight and the reaction temperatures are frequently about 50° to 80° C. A free radical initiator is chosen to effectively generate free radicals for polymerization within this temperature range. The polymerizations are carried out to 75 to 90% completion and the unreacted monomer can then be removed by volatilization. At this point the suspension can either be removed from the reactor and transferred to a reactor system typically suitable for vinyl acetate/ethylene polymerization or, if the PVC reactor is a suitable pressure vessel, the reaction of the vinyl acetate and ethylene can be carried out in the same reaction zone.

Particle size and porosity of the PVC are important for the VAE polymerization which follows and variables which control these parameters include the degree of conversion at the termination of the reaction, the colloidal system chosen as well as the concentration of the colloid, and the level of agitation during polymerization. As a general rule, the particle size is reduced as agitation is increased and the particle size is also decreased with increasing colloid concentration. Porosity is increased by decreasing the reaction temperature. The porosity desired is the same as that which is described in U.S. Pat. No. 3,562,354 and the PVC should be able to absorb at least 15 grams and preferably more than 25 grams of plasticizer per 100 grams of PVC.

The protective colloids which can be used include poly(vinyl alcohol), hydroxypropyl methyl cellulose, hydroxy-ethyl cellulose, hydroxypropyl cellulose, methyl cellulose, and the like. Poly(vinyl alcohol) with lower levels of hydrolysis of the poly(vinyl acetate) increase the porosity of the PVC particles.

Secondary stabilizers can also be added to give increased porosity of the PVC particles. These include nonionic, anionic or cationic surfactants. Free radical initiators used can include those from the classifications of diacetal peroxides, peroxydicarbonates, alkyl peroxyesters and azo initiators. Azo initiators are preferred since this class of initiator is known to be less prone to grafting reactions which are undesirable as discussed above.

The copolymerization of the vinyl acetate and ethylene is carried out in the presence of the porous PVC particles in a pressure vessel. In order to obtain ethylene levels in the range desired (about 20 to 35 wt %) in the vinyl acetate-ethylene copolymer, ethylene pressures of about 500 to 1500 psi are required. The initiators used for the VAE polymerization are of the free radical generating types where the initiator is soluble in the oil phase. After completing the polymerization of the VAE copolymer in the pores of the suspension or emulsion polymerized PVC, the residual monomers can be outgassed by conventional means. The resultant emulsion or suspension is then coagulated and dried to yield particulate solids. These polymers are essentially free flowing as is characteristic of the resultant dried, coagulated powder. Various additives, however, can be added to increase the flowability of these powders and such antiblocking agents are well known. Examples of such agents include talc, waxes, stearimides, cab-o-sil, diatomaceous earth, and the like. The free flowing powder product can be used for various applications which are typical of PVC formulations or they can be blended by known methods with other PVC to achieve the desired proportion of permanent plasticizer in the PVC blend for a particular application or fabrication.

Although the product obtained by this invention is referred to as a "blend", it is intended that this term not exclude minimal amounts of graft polymerization which may occur during the copolymerization of the vinyl acetate and ethylene in the presence of the PVC. Such polymerization, however, does not produce sufficient grafting to provide a problem of gel formation or cross-linking.

The products of this invention can be formulated with additives which are typically used for plasticized PVC. Such additivies include flow aids, for example, paraffinic and microcrystalline waxes, calcium stearate, zinc stearate, fatty acids, ester based lubricants such as glycerol and polyol esters, fatty alcohols and amides, for example, ethylene bis stearamide, and the like. Thermal stabilizers are also typically employed in the PVC compositions and can be used with the products of this invention. Typical PVC stabilizers include organo tin esters, for example dibutyl tin(iosoctyl mercapto acetate), dibutyl tin bis(alkyl maleate), n-octyl tin (tris isooctyl mercapto acetate), lead based stabilizers such as dibasic lead stearate, dibasic lead phthalate, and dibasic lead phosphite, and mixed metal stabilizers based on barium, cadmium or zinc soaps, organic phosphites, and the like. UV stabilizers can be incorporated for exterior applications and typical of these are the benzotriazoles, benzoates, benzophenones and oxanilides.

If even more flexibility is desired in the PVC composition, other plasticizers can be incorporated into the PVC-VAE blends of our invention. These include dioctyl phthalate, diisodecyl phthalate, undecyldodecyl phthalate, octyl decyl phthalate, low molecular weight polyesters, phosphate esters (for example, triphenyl phosphate, trioctyl phosphate, tricresyl phosphate and the like), chlorinated paraffins, azelaic and adipic acid derivatives, benzoic acid derivatives, and epoxydized soybean oil. Polymeric plasticizers such as polyester based polyurethanes, chlorinated polyethylene and ethylene/vinyl acetate/carbon monoxide terpolymers can also be added. Impact modifiers typically used for rigid PVC can be added for semi-flexible formulations to improve low temperature toughness.

At high levels of VAE incorporation (above 60 to 80 wt %) the resultant product will not exhibit free flowing characteristics desired for PVC compounding equipment, but the product does offer a modified VAE dispersion material which is useful since the PVC present provides reinforcement as well as flame retardant characteristics. This modified dispersion contains about 20 to 40 wt. % PVC.

Other advantages and features of our invention will be apparent from the following examples which are meant to be illustrative only and should not be construed to limit our invention unduly.

EXAMPLE 1

This example illustrates the preparation of a 50/50 weight ratio PVC/VAE blend where the desired VAE composition is 70% by weight vinyl acetate to 30% ethylene. All compositions listed are percent by weight unless otherwise indicated.

3.99 g (1% based on total monomer) of azobisisobutyronitrile (AIBN) was dissolved in 281.9 g of vinyl acetate. This vinyl acetate/initiator solution was then added to 399.2 g of poly(vinyl chloride). The poly(vinyl chloride) employed was PVC-1185C available from Air Products and Chemicals, Inc. The solution was allowed to swell the PVC for 15 minutes during which time the mixture was agitated by rolling. After the swilling was complete, as evidenced by the disappearance of any liquid phase from the mixture, the suspending medium was added. In this case, the suspending medium consisted of 2400 g of a 1% solution of poly(vinyl alcohol), Airvol 540, degree of hydrolysis=87-89%. After addition of the suspending medium the mixture was allowed to equilibrate with stirring for 15 minutes.

The resulting slurry was added to a water jacketed pressure reactor (4.5 L in capacity) equipped with a stirrer and appropriate inlet systems for the addition of ethylene. The stirring rate throughout the course of the reaction was 350 RPM. The reactor and slurry were purged with nitrogen to 30 psig and vented to the atmosphere two times to eliminate oxygen from the system. Next, the reactor system was purged with ethylene to 30 psig and again vented. Finally, the reactor was pressurized with ethylene to 500 psig and the system was allowed to equilibrate for 30 minutes with the ethylene pressure maintained by continued addition at 500 psig minimum. After the equilibration period, the temperature of the reactor was raised to 70° C. over a period of 37 minutes. During this temperature ramp the pressure in the reactor increased to a maximum of 720 psig after 1 hour and then the pressure decreased to 600 psig after 1.5 hours due to the steady incorporation of ethylene into the forming VAE copolymer. After 1 hour and 40 minutes had elapsed since the beginning of the heating ramp, the pressure of ethylene in the reactor was increased to 800 psig. After this ethylene pressure increase the pressure in the reactor again steadily decreased to 687 psig, 3 hours after the start of the heating ramp. The reactor was then cooled.

After cooling to 30° C., the excess pressure in the reactor was vented and the product of the reaction was removed. At this point, analysis of the residual monomer in the solid phase indicated that the concentration of unreacted vinyl acetate was 0.6%.

The foamy product was allowed to stand for 24 hours to help break the foam. The solid product was then filtered and washed twice with 6 liter portions of distilled water. After washing, the product was vacuum dried at 60° C. to constant weight.

Upon addition of a specimen of the above material to tetrahydrofuran, a viscous solution was formed with only a small fraction (<5%) of insoluble material. This indicated that minimal graft polymerization occurred.

When subjected to melt mixing conditions at 140°-180° C. the product was transparent and maintained good rheological properties. Compression molded samples of the melt mixed material had greater flexibility and a lower glass transition temperature (41° C.) than poly(vinyl chloride) homopolymer.

Additionally, isolated solid particles prepared in this reaction maintained good flow characteristics when dry. The particles can preferably be dispersed with a fumed silica to help prevent blocking.

EXAMPLE 2

This example illustrates the preparation of a 60/40 weight ratio PVC/VAE blend where the desired composition of the VAE is 70/30 vinyl acetate to ethylene.

4.79 g of azobiosisobutyronitrile (1.0% based on total monomer) was added to 336.4 g of vinyl acetate and allowed to dissolve. Next, this monomer/initiator solution was added to 320.1 g of PVC. This mixture was allowed to swell the PVC, with rolling, for 15 minutes. When the swelling was complete, the dispersing medium was added. In this case, the dispersing medium consisted of 2400 g of a solution of two types of poly(vinyl alcohol); 0.1% of Airvol 540 (87-89% hydrolyzed) and 0.05% of Kuraray L9 (72% hydrolyzed).

After allowing this mixture to equilibrate for 5 minutes, the premix solution was added to the pressure reactor. The stirring rate was maintained at 350 RPM throughout the course of the reaction. The premix was purged two times with nitrogen to 30 psig and vented to the atmosphere after each purge. Next, the reactor was purged once with ethylene and again vented. Finally, the reactor was pressurized with ethylene to 800 psig and allowed to equilibrate for 30 minutes. During this equilibration, additional ethylene was added as required to maintain 800 psig of pressure in the reactor.

The heating ramp began at 30° C. and the pressure inside the reactor had increased to 1600 psig by the time the temperature had reached 55° C. Pressure was maintained below 1600 psig by relieving pressure as necessary until the temperature reached the desired setting of 70° C. The reactor pressure again decreased with time as the reaction proceeded until the system was cooled, 2.5 hours after the heating ramp was begun.

After cooling, the reactor was vented and the product removed. In this case, there was no problem with foaming and the product could be isolated easily. Analysis of the solid phase indicated 1.3% unreacted vinyl acetate. This sample was isolated and washed as in Example 1, above.

The material prepared in this example was again nearly totally soluble in tetrahydrofuran and exhibited good melt characteristics and flexibility (glass transition=30° C.).

The isolated powder product from this reaction also maintained good properties when dry. Again, fumed silica is preferably added to maintain good powder handling characteristics.

EXAMPLE 3

This example when compared to Examples 1 and 2 illustrates the advantage of added stabilizer in achieving a stable suspension. The composition sought is identical to that listed in Example 1 above.

4.01 g of azobisisobutyronitrile (1.0% based on total monomer) was added to 279.8 g of vinyl acetate and allowed to dissolve. The resulting solution was swollen into 400.7 g of PVC with rolling. When the swelling was complete, the dispersing medium, 2403 g of distilled water, was added to the mixture.

The resulting slurry was added to the reactor and purged with nitrogen twice and ethylene once as described in Examples 1 and 2 above. The stirring rate was set to 500 RPM. The ethylene pressure was raised to 550 psig and allowed to equilibrate for 30 minutes.

The reactor temperature was then raised to 60° C. then, after 1.5 hours, it was raised to 70° C. The pressure decreased due to the ethylene incorporation and the reaction was eventually cooled, 2.5 hours after the start of the heating ramp.

After cooling, the reactor was vented of excess pressure. In this case, however, the product could not easily be removed from the reactor. Continued water flow through the reactor was not sufficient to dislodge the product from the interior of the reactor. Only when the entire top assembly of the reactor was dismantled, could be product finally be removed. In this case, the individual particles were seen to mass together to form many particle agglomerates during the course of the reaction.

The solubility of the resulting product in tetrahydrofuran was complete. The melt properties and flexibility were very good as in Examples 1 and 2 above (glass transition=39° C.).

The isolated particle masses in this case did not tend to fuse further after isolation from the reaction medium, and could be employed in conventional PVC compounding operations.

EXAMPLE 4

The isolated product from Example 1 was fluxed in a brabender at 170°–185° C. 3% (by weight) of TM-181 organotin stabilizer from Cincinnati, Milacron, Co., Cincinnati, Ohio was added to stabilize the blend. The resultant product was compression molded at 170° C. in a 20 mil cavity mold. Tensile specimens were cut from the resultant molded sample and tested in an Instron testing machine for tensile modulus, tensile strength and elongation at break. The glass transition temperature was determined with a Perkin-Elmer DSC-2C at a heating rate of 10° C./min. starting from −50° C. The results given in Table 1 illustrate good physical properties for plasticized PVC.

TABLE I

| Tensile Modulus = | 215,000 psi |
| Tensile Strength = | 8,000 psi |
| % Elongation @ Break = | 105% |
| Tg Onset °C. = | 31° C. |
| Tg (midpoint) = | 41° C. |

EXAMPLE 5

The isolated product from Example 2 was fluxed in a brabender at 170°–185° C. 3% (by weight) of TM-181 was added to stabilize the blend. The resultant product was compression molded at 170° C. in a 20 mil cavity mold. The sample was tested as per the procedure noted in Example 4. The results given in Table II demonstrate good physical properties for the 60/40 PVC/VAE blend:

TABLE II

| Tensile Modulus = | 91,300 psi |
| Tensile Strength = | 5,100 psi |
| % Elongation @ Break = | 140% |
| Tg Onset °C. = | 20° C. |
| Tg (midpoint) = | 30° C. |

EXAMPLE 6

The isolated product from Example 1 was mixed with dioctyl phthalate (DOP) at levels of 16% and 21.5% based on total weight. 3% TM-181 was added to each blend for stabilization. The resultant powder was fluxed in a brabender at 175° C. The samples were compression molded in a 20 mil cavity mold at 170° C. followed by mechanical property determination as given in Table III.

TABLE III

|  | 84% Example 1 16% DOP +3% TM-181 | 79.5% Example 1 21.5% DOP +3% TM-181 |
| --- | --- | --- |
| Tensile Modulus | 2,800 psi | 560 psi |
| Tensile Strength | 2,500 psi | 1,300 psi |
| % Elongation @ Break | 240% | 230% |

EXAMPLE 7

The isolated product from Example 2 was mixed with dioctyl phthalate at 16 wt %. 3% TM-181 was added to the blend for stabilization. The resultant powder was fluxed in a brabender at 175° C. The sample was compression molded in a 20 mil cavity mold at 170° C. followed by mechanical property determination as given in Table IV.

TABLE IV

| Tensile Modulus = | 740 psi |
| Tensile Strength = | 1,200 psi |
| % Elongation @ Break = | 245% |

The above examples demonstrate that this invention provides a plasticized PVC product which can be readily compounded and molded. Other advantages and embodiments of our invention will be apparent from the foregoing disclosure without parting from the spirit of scope of our invention.

We claim:

1. A method of making a blend of poly(vinyl chloride) and vinyl acetate/ethylene copolymer which comprises copolymerizing vinyl acetate and ethylene in a suspension or dispersion system in the presence of porous particles of poly(vinyl chloride) under conditions and monomer proportions to form a vinyl acetate/ethylene copolymer containing 60 to 85 weight percent vinyl acetate.

2. The method of claim 1 wherein said poly(vinyl chloride) has a particle size of about 50 to 200 microns.

3. The method of claim 1 wherein from 20 to 60 weight percent of said blend is vinyl acetate/ethylene copolymer.

4. The method of claim 3 further comprising the recovery of said blend in the form of solid flowable particles.

5. The method of claim 1 wherein said copolymerizing takes place in an aqueous suspension or dispersion containing a stabilizing dispersant.

6. The method of claim 5 wherein said dispersant is poly(vinyl alcohol).

7. The method of claim 2 wherein said poly(vinyl chloride) particles have a porosity enabling them to absorb at least 15 grams of plasticizer per 100 grams of polymer.

8. A free flowing particulate blend of poly(vinyl chloride) and vinyl acetate/ethylene copolymer made by the method of claim 1.

9. The particulate blend of claim 8 further comprising an anti-blocking agent.

10. A modified vinyl acetate/ethylene copolymer dispersion containing about 20 to 40 weight percent poly(vinyl chloride) and formed by the method of claim 1.

* * * * *